(12) United States Patent
Kim et al.

(10) Patent No.: US 8,359,521 B2
(45) Date of Patent: Jan. 22, 2013

(54) PROVIDING A MEMORY DEVICE HAVING A SHARED ERROR FEEDBACK PIN

(75) Inventors: Kyu-hyoun Kim, Mount Kisco, NY (US); Paul W. Coteus, Yorktown Heights, NY (US); Timothy J. Dell, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 1159 days.

(21) Appl. No.: 12/018,030

(22) Filed: Jan. 22, 2008

(65) Prior Publication Data

US 2009/0187794 A1 Jul. 23, 2009

(51) Int. Cl.
  *H03M 13/00* (2006.01)
  *G11C 29/00* (2006.01)
(52) U.S. Cl. ......................... 714/758; 714/766
(58) Field of Classification Search .................. 714/718, 714/758, 766
  See application file for complete search history.

(56) References Cited

U.S. PATENT DOCUMENTS

| | | | |
|---|---|---|---|
| 4,159,538 A | 6/1979 | Motsch | |
| 5,159,598 A * | 10/1992 | Welles et al. | 714/724 |
| 5,513,135 A | 4/1996 | Dell et al. | |
| 5,761,697 A | 6/1998 | Curry et al. | |
| 5,768,173 A | 6/1998 | Seo et al. | |
| 5,900,887 A | 5/1999 | Leung et al. | |
| 6,185,207 B1 * | 2/2001 | LaBerge et al. | 370/392 |
| 6,272,053 B1 | 8/2001 | Choi | |
| 6,601,210 B1 * | 7/2003 | Kagan | 714/758 |
| 6,711,067 B1 | 3/2004 | Kablanian | |
| 6,717,884 B2 | 4/2004 | Kim | |
| 6,725,414 B2 | 4/2004 | Seyyedy | |
| 6,779,150 B1 * | 8/2004 | Walton et al. | 714/763 |
| 6,854,078 B2 * | 2/2005 | Kinoshita et al. | 714/718 |
| 6,868,516 B1 * | 3/2005 | Walton et al. | 714/758 |
| 7,203,890 B1 * | 4/2007 | Normoyle | 714/768 |
| 7,263,647 B2 * | 8/2007 | Bryant et al. | 714/758 |
| 7,620,853 B1 * | 11/2009 | Kasnavi et al. | 714/42 |
| 7,634,713 B1 * | 12/2009 | Ngo | 714/781 |
| 7,681,095 B2 * | 3/2010 | Behrends et al. | 714/718 |
| 7,890,835 B2 * | 2/2011 | Kwak | 714/758 |
| 7,913,150 B2 * | 3/2011 | Miranda | 714/781 |
| 8,020,115 B2 * | 9/2011 | Borri | 715/785 |
| 8,055,975 B2 * | 11/2011 | Lilly et al. | 714/758 |
| 2006/0083043 A1 | 4/2006 | Cypher | |

* cited by examiner

*Primary Examiner* — James C Kerveros
(74) *Attorney, Agent, or Firm* — Cantor Colburn LLP; William A. Kinnaman, Jr.

(57) ABSTRACT

A system and method for providing a memory device having a shared error feedback pin. The system includes a memory device having a data interface configured to receive data bits and CRC bits, CRC receiving circuitry, CRC creation circuitry, a memory device pad, and driver circuitry. The CRC receiving circuitry utilizes a CRC equation for the detection of errors in one or more of the received data and the received CRC bits. The CRC creation circuitry utilizes the CRC equation for the creation of CRC bits consistent with data to be transmitted to a separate device bits. The memory device pad is configured for reporting of any errors detected in the received data and the received CRC bits. The driver circuitry is connected to the memory device pad and merged with one or more other driver circuitries resident on one or more other memory devices into an error reporting line.

18 Claims, 10 Drawing Sheets

CRC polynomial and bit mapping (X8)

| x8 | | Lane | | | | | | | | |
|---|---|---|---|---|---|---|---|---|---|---|
| | | 0 | 1 | 2 | 3 | 4 | 5 | 6 | 7 | 8 |
| transfer | 0 | u8 | u7 | u6 | u5 | u4 | u3 | u2 | u1 | u0 |
| | 1 | u17 | u16 | u15 | u14 | u13 | u12 | u11 | u10 | u9 |
| | 2 | u26 | u25 | u24 | u23 | u22 | u21 | u20 | u19 | u18 |
| | 3 | u35 | u34 | u33 | u32 | u31 | u30 | u29 | u28 | u27 |
| | 4 | u44 | u43 | u42 | u41 | u40 | u39 | u38 | u37 | u36 |
| | 5 | u53 | u52 | u51 | u50 | u49 | u48 | u47 | u46 | u45 |
| | 6 | u62 | u61 | u60 | u59 | u58 | u57 | u56 | u55 | u54 |
| | 7 | crc7 | crc6 | crc5 | crc4 | crc3 | crc2 | crc1 | crc0 | u63 |

$g(x) = x^8 + x^6 + x^5 + x^4 + x^3 + x^2 + x + 1 = (x^7+x^6+x^4+x^2+1)(x+1)$

Extended Hamming code:
- All lane errors
- All transfer errors except the error pattern 111111101 on every transfer
- up to any three bit error

FIG. 7

CRC equations (X8)

crc[0]=u[1]^u[2]^u[3]^u[5]^u[6]^u[7]^u[8]^u[11]^u[13]^u[16]^u[18]^u[19]^u[20]^u[25]^u[26]^u[27]^u[28]^u[29]^u[31]^u[32]^u[35]^u[38]^u[39]^u[40]^u[41]^u[43]^u[45]^u[46]^u[47]^u[48]^u[49]^u[50]^u[54]^u[57]^u[63];

crc[1]=u[0]^u[1]^u[4]^u[5]^u[9]^u[11]^u[12]^u[13]^u[14]^u[16]^u[17]^u[18]^u[21]^u[25]^u[30]^u[31]^u[33]^u[35]^u[36]^u[38]^u[42]^u[43]^u[44]^u[45]^u[51]^u[54]^u[55]^u[57]^u[58]^u[63];

crc[2]=u[3]^u[7]^u[8]^u[10]^u[11]^u[12]^u[14]^u[15]^u[16]^u[17]^u[20]^u[22]^u[25]^u[27]^u[28]^u[29]^u[34]^u[35]^u[36]^u[37]^u[38]^u[40]^u[41]^u[44]^u[47]^u[48]^u[49]^u[50]^u[52]^u[54]^u[55]^u[56]^u[57]^u[58]^u[59]^u[63];

crc[3]=u[1]^u[2]^u[3]^u[4]^u[5]^u[6]^u[7]^u[9]^u[12]^u[15]^u[17]^u[19]^u[20]^u[21]^u[23]^u[25]^u[27]^u[30]^u[31]^u[32]^u[36]^u[37]^u[40]^u[42]^u[43]^u[46]^u[47]^u[51]^u[53]^u[54]^u[55]^u[56]^u[58]^u[59]^u[60]^u[63];

crc[4]=u[1]^u[4]^u[10]^u[11]^u[19]^u[21]^u[22]^u[24]^u[25]^u[27]^u[29]^u[33]^u[35]^u[37]^u[3]^u[40]^u[44]^u[45]^u[46]^u[49]^u[50]^u[52]^u[55]^u[56]^u[59]^u[60]^u[61]^u[63];

crc[5]=u[1]^u[3]^u[6]^u[7]^u[8]^u[12]^u[13]^u[16]^u[18]^u[19]^u[22]^u[23]^u[27]^u[29]^u[30]^u[31]^u[32]^u[34]^u[35]^u[36]^u[39]^u[43]^u[51]^u[53]^u[54]^u[56]^u[60]^u[61]^u[62]^u[63];

crc[6]=u[0]^u[1]^u[3]^u[4]^u[5]^u[6]^u[9]^u[11]^u[14]^u[16]^u[17]^u[18]^u[23]^u[24]^u[25]^u[26]^u[27]^u[29]^u[30]^u[33]^u[36]^u[37]^u[38]^u[39]^u[41]^u[43]^u[44]^u[45]^u[46]^u[47]^u[48]^u[52]^u[55]^u[61]^u[62];

crc[7]=u[0]^u[2]^u[4]^u[5]^u[6]^u[7]^u[10]^u[12]^u[15]^u[17]^u[18]^u[19]^u[24]^u[25]^u[26]^u[27]^u[28]^u[30]^u[31]^u[34]^u[37]^u[38]^u[39]^u[40]^u[42]^u[44]^u[45]^u[46]^u[47]^u[48]^u[49]^u[53]^u[56]^u[62]^u[63];

FIG. 8

CRC polynomial and bit mapping (X4)

| x4 | | Lane | | | | |
|---|---|---|---|---|---|---|
| | | 0 | 1 | 2 | 3 | 4 |
| | 0 | u4 | u3 | u2 | u1 | u0 |
| | 1 | u9 | u8 | u7 | u6 | u5 |
| | 2 | u14 | u13 | u12 | u11 | u10 |
| | 3 | u19 | u18 | u17 | u16 | u15 |
| transfer | 4 | u24 | u23 | u22 | u21 | u20 |
| | 5 | u29 | u28 | u27 | u26 | u25 |
| | 6 | crc3 | crc2 | crc1 | crc0 | u30 |
| | 7 | crc7 | crc6 | crc5 | crc4 | u31 |

$g(x) = x^8 + x^6 + x^5 + x^4 + x^3 + x^2 + x + 1 = (x^7 + x^6 + x^4 + x^2 + 1)(x+1)$

Extended Hamming code (same polynomial as x8 design)
•All lane errors
•All transfer errors
•up to any three bit error

FIG. 9

CRC equations (X4)

crc[0]=u[0]^u[4]^u[5]^u[8]^u[10]^u[11]^u[14]^u[15]^u[19]^u[21]^u[22]^u[23]^u[24]^u[26]^u[27]^u[28]^u[31];

crc[1]=u[3]^u[4]^u[5]^u[6]^u[7]^u[9]^u[10]^u[13]^u[16]^u[17]^u[18]^u[19]^u[21]^u[23]^u[24]^u[25]^u[26]^u[27]^u[28]^u[31];

crc[2]=u[0]^u[1]^u[3]^u[5]^u[6]^u[8]^u[12]^u[13]^u[14]^u[15]^u[21]^u[24]^u[25]^u[27]^u[28]^u[31];

crc[3]=u[0]^u[2]^u[3]^u[6]^u[9]^u[10]^u[11]^u[12]^u[14]^u[16]^u[17]^u[18]^u[19]^u[20]^u[21]^u[25]^u[28]^u[31];

crc[4]=u[0]^u[1]^u[3]^u[4]^u[7]^u[10]^u[11]^u[12]^u[13]^u[15]^u[17]^u[18]^u[19]^u[20]^u[21]^u[22]^u[26]^u[29]^u[31];

crc[5]=u[2]^u[3]^u[5]^u[7]^u[8]^u[10]^u[14]^u[15]^u[16]^u[17]^u[23]^u[26]^u[27]^u[29]^u[30]^u[31];

crc[6]=u[1]^u[4]^u[5]^u[6]^u[7]^u[9]^u[11]^u[12]^u[13]^u[14]^u[15]^u[16]^u[20]^u[23]^u[29]^u[30];

crc[7]=u[0]^u[2]^u[4]^u[6]^u[7]^u[11]^u[12]^u[13]^u[16]^u[17]^u[19]^u[22]^u[23]^u[26]^u[27]^u[28]^u[30]^u[31];

FIG. 10

PROVIDING A MEMORY DEVICE HAVING A SHARED ERROR FEEDBACK PIN

BACKGROUND OF THE INVENTION

This invention relates generally to computer memory, and more particularly to a memory device having a shared error feedback pin.

Contemporary high performance computing main memory systems are generally composed of memory devices, which are connected to one or more processors via one or more memory control elements. These memory devices are generally located on a memory card module and connected through a module connector to a mother board.

FIG. 1 depicts a memory subsystem that includes a memory controller 402, one or more memory busses 404, each connected each connected to one or more DIMMs 406. Each DIMM 406 includes memory devices 410 and may or may not include a PLL, register devices, buffer devices and other logic interface devices, in addition to other passive components.

FIG. 2 depicts a contemporary system composed of an integrated processor chip 100, which contains one or more processor elements and an integrated memory controller 110. In the configuration depicted in FIG. 2, multiple independent cascade interconnected memory interface busses 106 are logically aggregated together to operate in unison to support a single independent access request at a higher bandwidth with data and error detection/correction information distributed or "striped" across the parallel busses and associated devices. The memory controller 110 attaches to four narrow/high speed point-to-point memory busses 106, with each bus 106 connecting one of the several unique memory controller interface channels to a cascade interconnect memory subsystem 103 (or memory module, e.g., a dual in-line memory module or "DIMM") which includes at least a hub device 104 and one or more memory devices 109. In the system depicted in FIG. 2, there are "n" ranks. Typically those "n" ranks share the common narrow/high speed busses and are not accessed simultaneously. Thus, data signal pins of those ranks are directly connected to common signal lines in a time-multiplexing manner. However, read clock signals cannot be directly connected in the same manner because they are driven by individual chips (e.g. memory devices) all the time, whereas data signals are driven by a certain chip for a short period of time when the chip is being accessed. Some systems further enable operations when a subset of the memory busses 106 are populated with memory subsystems 103. In this case, the one or more populated memory busses 108 may operate in unison to support a single access request.

FIG. 3 depicts a memory structure with cascaded memory modules 103 and unidirectional busses 106. One of the functions provided by the hub devices 104 in the memory modules 103 in the cascade structure is a re-drive function to send signals on the unidirectional busses 106 to other memory modules 103 or to the memory controller 110. FIG. 3 includes the memory controller 110 and four memory modules 103, on each of two memory busses 106 (a downstream memory bus with 24 wires and an upstream memory bus with 25 wires), connected to the memory controller 110 in either a direct or cascaded manner. The memory module 103 next to the memory controller 110 is connected to the memory controller 110 in a direct manner. The other memory modules 103 are connected to the memory controller 110 in a cascaded manner. Each memory module 103 may include one or more ranks of memory devices 109. Although not shown in this figure, the memory controller 110 may be integrated in the processor 100 and may connect to more than one memory bus 106 as depicted in FIG. 2.

BRIEF SUMMARY OF THE INVENTION

An exemplary embodiment includes a memory device having a data interface, CRC receiving circuitry, CRC creation circuitry, a memory device pad, and driver circuitry. The data interface is configured to receive data bits and CRC bits. The CRC receiving circuitry utilizes a CRC polynomial equation for the detection of errors, thereby enabling the memory device to detect the presence of errors in one or more of the received data and the received CRC bits. The CRC creation circuitry utilizes the CRC polynomial equation for the creation of CRC bits consistent with data to be transmitted to a separate device, thereby enabling the separate device to detect the presence of errors in one or more of the transmitted data and the transmitted CRC bits. The memory device pad is configured for reporting of any errors detected in the received data and the received CRC bits. The driver circuitry is connected to the memory device pad. The driver circuitry is merged with one or more other driver circuitries resident on one or more other memory devices into an error reporting line that is adapted to communicate with the separate device via an interconnection means, resulting in a predetermined error-recovery response.

Another exemplary embodiment includes a method for identifying the existence of one or more errors included in data or CRC received by a memory device. The method includes receiving data bits and CRC bits at a memory device over multiple transfers. The multiple transfers include a packet of information and each transfer includes more than one bit of information. It is determined if an error is present in one or more of the received data bits and the received CRC bits. The determining is responsive to a CRC polynomial equation. An error signal is driven to a separate device upon determining that an error is present to initiate an error recovery sequence. The error signal is driven via a memory device driver.

A further exemplary embodiment includes a memory system including one or more memory channels, one or more memory devices, and an interconnection means. Each of the channels are operable together with one or more of the other channels or separately. The memory device interface with the one or more memory channels such that information can be written to or read from via the one or more memory channels. The interconnection means is utilized to send an error signal driven by one or more of the memory devices. Each of the memory devices includes a data interface, CRC receiving circuitry, CRC creation circuitry, a memory device pad, and driver circuitry. The data interface is configured to receive data bits and CRC bits. The CRC receiving circuitry utilizes a CRC polynomial equation for the detection of errors, thereby enabling the memory device to detect the presence of errors in one or more of the received data and the received CRC bits. The CRC creation circuitry utilizes the CRC polynomial equation for the creation of CRC bits consistent with data to be transmitted to a separate device, thereby enabling the separate device to detect the presence of errors in one or more of the transmitted data and the transmitted CRC bits. The memory device pad is configured for reporting of any errors detected in the received data and the received CRC bits. The driver circuitry is connected to the memory device pad. The driver circuitry is merged with one or more other driver circuitries resident on one or more other memory devices into an error reporting line that is adapted to communicate with the separate device via the interconnection means, resulting in a pre-determined error-recovery response.

BRIEF DESCRIPTION OF THE DRAWINGS

Referring now to the drawings wherein like elements are numbered alike in the several FIGURES:

FIG. 7 depicts an exemplary polynomial that may be implemented by an exemplary embodiment;

FIG. 8 depicts an expanded version of the polynomial depicted in FIG. 7;

FIG. 9 depicts an exemplary polynomial that may be implemented by an exemplary embodiment; and FIG. 10 depicts an expanded version of the polynomial depicted in FIG. 9.

DETAILED DESCRIPTION OF EXEMPLARY EMBODIMENTS

Figure 1:
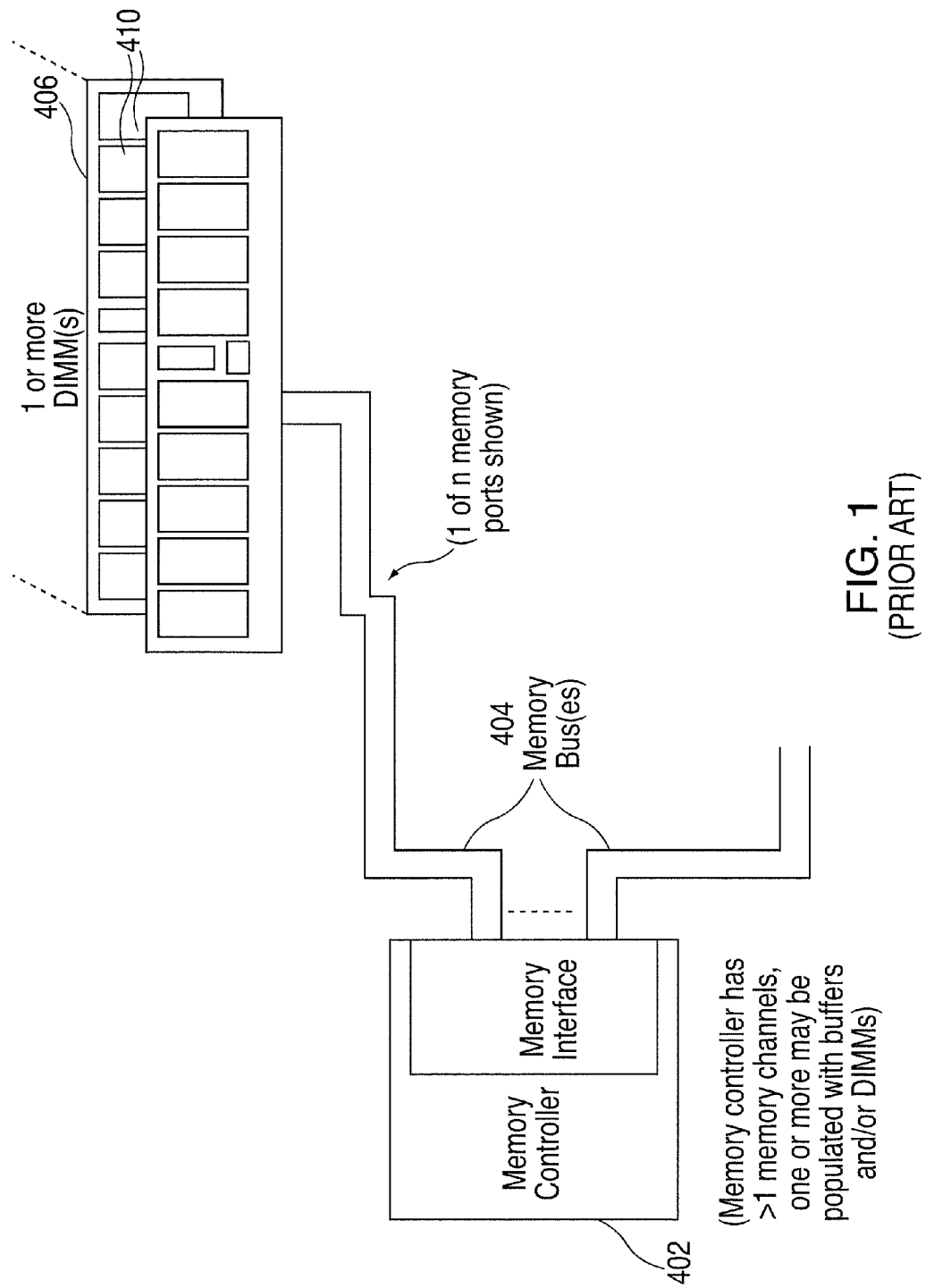
FIG. 1 depicts an exemplary memory subsystem.
Figure 2:
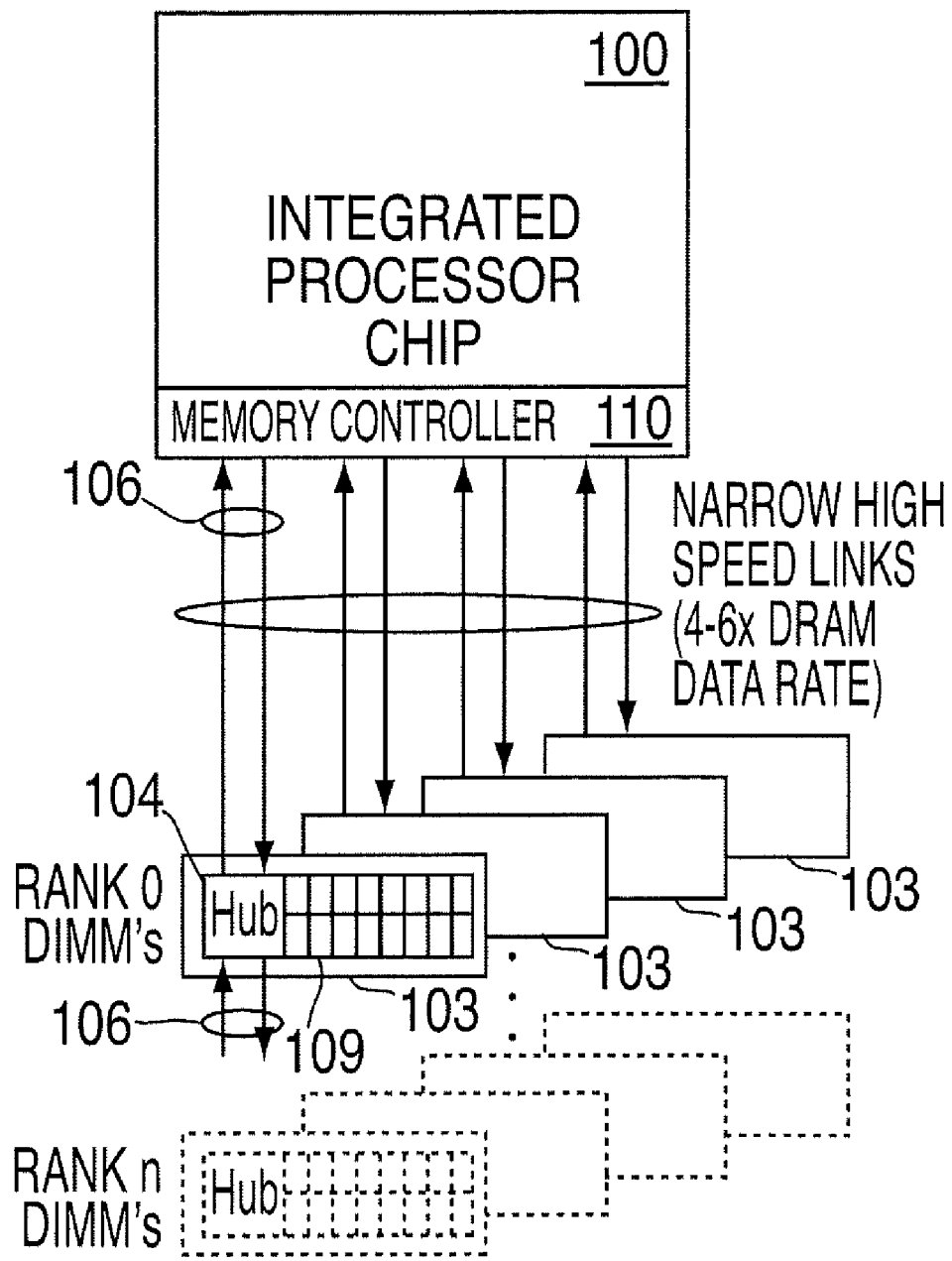
FIG. 2 depicts a cascade interconnect memory system with unidirectional busses.
Figure 3:
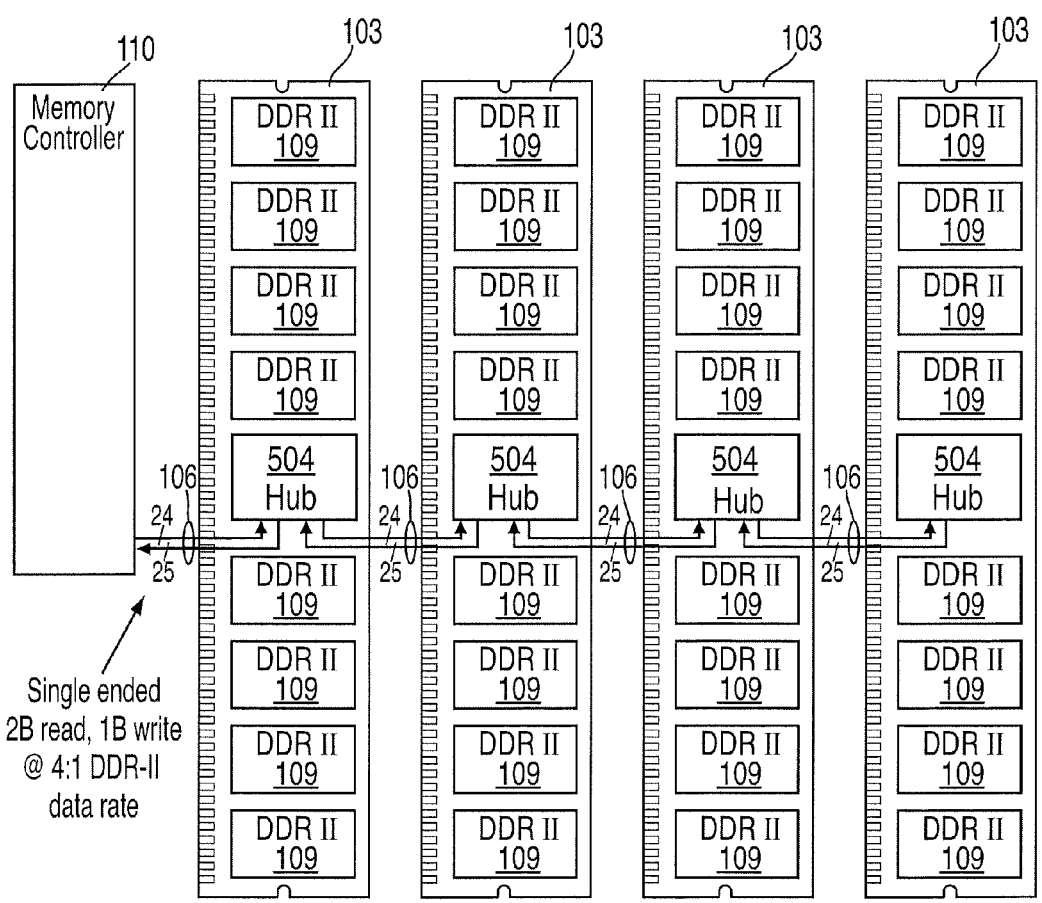
FIG. 3 depicts a cascade interconnect memory system with unidirectional busses.

As memory interface speed increases, the probability of soft errors taking place during the transmission of information across the interface increases. Current methods for the detection of address, command and/or data errors during memory transfers over a memory interface do not include error checking on the DRAM itself. An exemplary embodiment of the present invention provides error checking on the memory device (e.g., DRAM) and the ability to share an error feedback pin between memory devices.

Conventional memory devices utilized in main storage applications, such as synchronous dynamic RAMs, do not include a timely means for detecting and reporting errors on data transfers. In prior high reliability memory systems, the reliability of the stored data was often ensured via such techniques as error correcting code (ECC) where an ECC check bit pattern, calculated by the memory controller, is stored in the memory devices along with the data being written. During subsequent read operations, the ECC check bits are returned to the memory controller along with the data being read, with the memory control device then comparing the received ECC check bits with ECC syndrome bits that are generated from the read data, with the syndrome bits then exclusive or'ed with the received check bits to allow identification and repair of single or multiple bit errors, depending on the ECC code coverage. This technique, although very useful in prior systems, has limitations in relation to the amount of error detection, does not permit timely identification of transmission errors during write operations to the memory devices, requires sufficient memory devices that the ECC code can also be stored (memory size and cost overhead) and is generally only used in higher-cost systems. Contemporary high volume/consumer products generally include no error detection means on data written to the memory devices, nor a timely error detection means for data being sent to the memory.

High reliability systems may also include additional methods for ensuring valid address and command transfers from the memory controller to the target memory devices, ranging from simple parity functions (with one or more parity bits included with address/command transfers) to more complex error detection and correction methods where parity and/or ECC check bits are included with the address and command bits sent by the memory control device to the memory subsystem, with non-memory components within the memory subsystem including compatible parity and/or ECC circuitry to allow for the detection (and in the case of ECC, also the correction) of transmission or other errors within the received address and command information to the extent of the parity and/or ECC code coverage.

In contemporary memory devices, no means exists for the memory devices to identify and report errors associated with address, command and/or data information sent to the device. Further, future devices are being considered where the memory device may include CRC circuitry for the detection of interface errors, in response to higher speed memory interfaces, where such high speed interface operation will significantly increase the probability that intermittent errors which corrupt one or more transfers associated with address, command or data information. If not properly implemented, such circuitry will not enable systems to survive these random error events—at least not in a manner which does not otherwise impact the cost, complexity and performance of the memory system.

Various proposals are being considered for future memory technologies and the related memory systems, such as those based on future double data rate memory devices. In each of these proposals, either a reduction in useable bandwidth, an increase in read/write turn-around time and/or a significant increase in the number of memory write buffers are needed in the memory controller to permit recovery from write data operations. An exemplary embodiment of the present invention offers an innovative solution where a single pin is used, dotted via an open drain or related method across memory devices in a memory subsystem, to report write data errors to the memory devices and/or address and command errors to the memory devices or subsystem comprising the memory devices, in a timely manner that maximizes use of available bandwidth, simplifies the memory controller and ensures the ability for a well-designed system to quickly recover from both read and write errors to the memory subsystem.

In the exemplary memory system, CRC generation and checking is completed both at the memory devices as well as at the memory controller for data transfers. In addition, if some method of checking address and command transfers is used (e.g. either parity, CRC and/or ECC), errors identified during address and command transfers can be reported by dotting or otherwise merging this error with the memory device error signal. In exemplary embodiments these errors are timed such that they are reported at a consistent timeframe relative to the failing address, command or data being received.

In an exemplary embodiment during read operations, the memory devices will generate and send a CRC code to the memory controller, with the CRC code generated using a pre-determined algorithm that is implemented in a manner that is consistent between the memory devices and the memory controller. Upon receipt of the read data packet, the memory controller then generates a new set of CRC bits, using the same algorithm or a compatible algorithm, and compares the two CRC results. If the results are identical, the memory data is valid. If different, the memory controller re-tries the memory read operation.

When also included in the memory system, errors identified with the address and/or command information associated with the write would result in errors sent to the memory controller on the same common "write acknowledge" or "error" pin, using a pre-defined polarity to identify receipt of bad parity, CRC, ECC or other error indication means in conjunction with the write address and command.

In an exemplary embodiment, during write operations, the data sent to the memory devices includes CRC bits generated by the memory controller based on a pre-determined algorithm that is consistent between the memory devices and the memory controller. Upon receipt of the write data packet, the memory devices then generate a new set of CRC bits, using the same algorithm or a compatible algorithm, and compare the two CRC results. If the results are identical, the memory data is valid. If different, the memory device(s) signal the memory controller, using a common "write acknowledge" or "error" pin, immediately upon detection of the error. Given the slower speed of the error signal (which in the exemplary embodiment, is operable at a speed that is consistent with the time the memory devices would complete the write burst operation), the memory controller typically receives the error indication after the subsequent read or write operation. To ensure that all write data errors are recoverable without creating a system fault, the memory controller includes sufficient write buffer depth (e.g. at least two or more full packets of depth, such as 2×36 bytes or 2×72 bytes), in an exemplary embodiment, thereby still retaining both the current and previous (e.g. defective) write operation. As such, the memory controller could initiate a re-try of the failed write operation. In alternate exemplary embodiments, the write buffer has a depth of three or four compete packets dependent on the amount of data required to be stored.

As evidenced by the above example, by returning the error signal in a timely manner (e.g. via the exemplary error signal from the DRAM(s) receiving bad write data), the memory controller requires a very shallow write buffer structure, there is no requirement for the memory device/subsystem to send "poisoned" CRC data back to the memory controller during a read operation (thereby requiring many "write" operations to be re-completed), the bus turn-around time between reads and writes are minimized (there would be no need for the memory devices to separately send CRC bits back to the memory controller when write data is received), etc.

In an exemplary embodiment, one pin is added to each memory device for reporting CRC errors on write operations. In a memory subsystem, this pin is dotted (e.g. via a open drain output) to other memory devices being accessed at the same time (e.g. a "rank" of devices), and could also be merged with an existing error pin available on many industry standard modules for the reporting of address/command errors (e.g. as determined via a parity bit that is sent in conjunction with each address/command operation).

In an exemplary embodiment the CRC code is generated and checked at both the memory device and the memory controller, depending on the operation (read or write)

In an exemplary embodiment the CRC code utilized is developed such that each memory device calculates and checks the CRC information related to the data bits received by it or sent to it.

Figure 4:
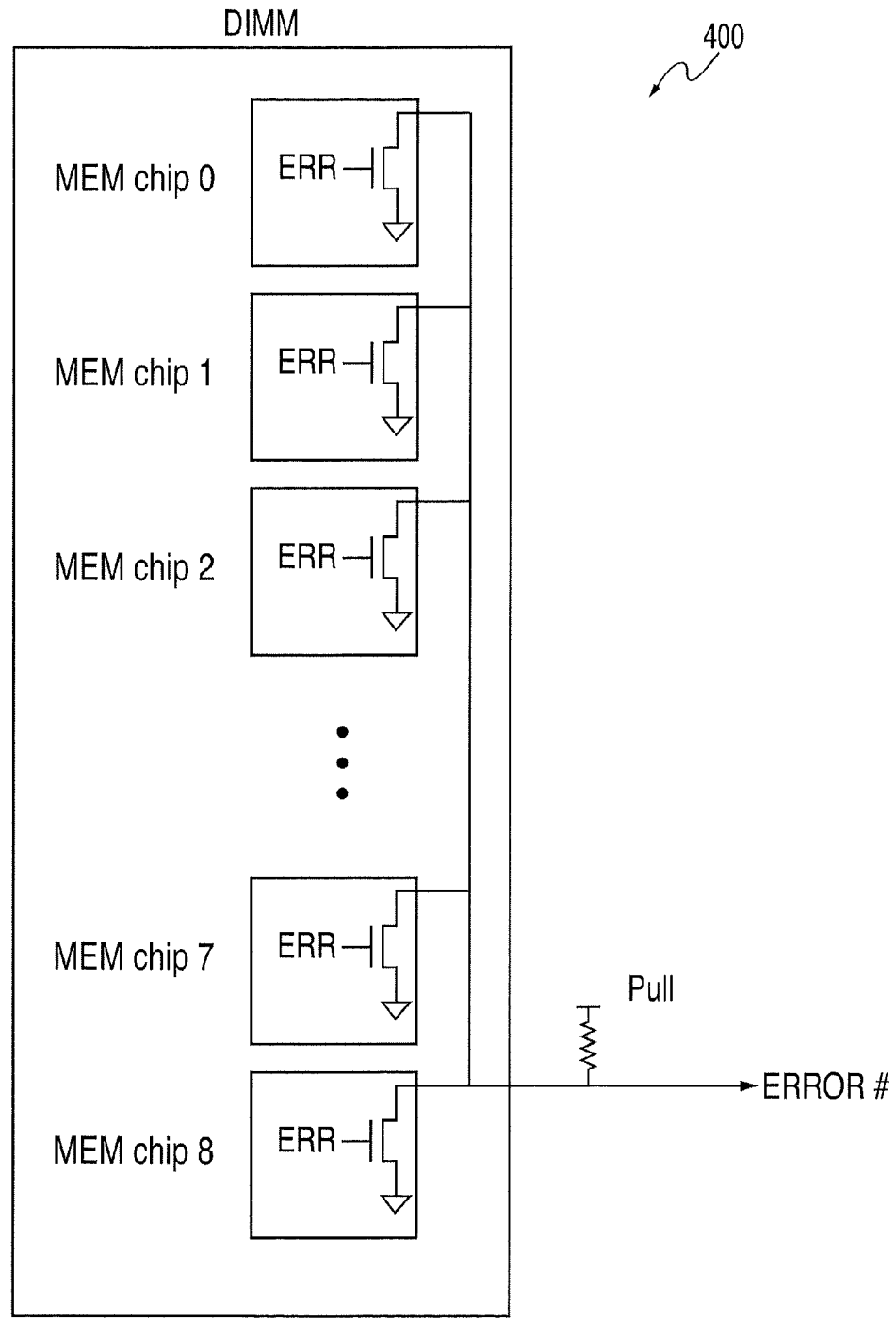
FIG. 4 is a block diagram of a memory module having an error feedback pin that is shared among multiple device in accordance with an exemplary embodiment of the present invention.

FIG. 4 is a block diagram of a memory module 400 having an error feedback pin that is shared among multiple devices in accordance with an exemplary embodiment of the present invention. As depicted in FIG. 4, the error output line from the memory devices are dotted together via open drain drivers to a single error line that is output from the memory module 400. In an exemplary embodiment, the error line output from the memory module 400 is in communication with a memory controller. In an exemplary embodiment, the memory devices are directly connected to the memory controller (e.g., via an unbuffered DIMM). In an alternate exemplary embodiment, the memory devices are connected to the memory controller via other devices (e.g., one or more registers, hubs or other interface devices) or may connect to a service processor or other error handling device.

Figure 5:
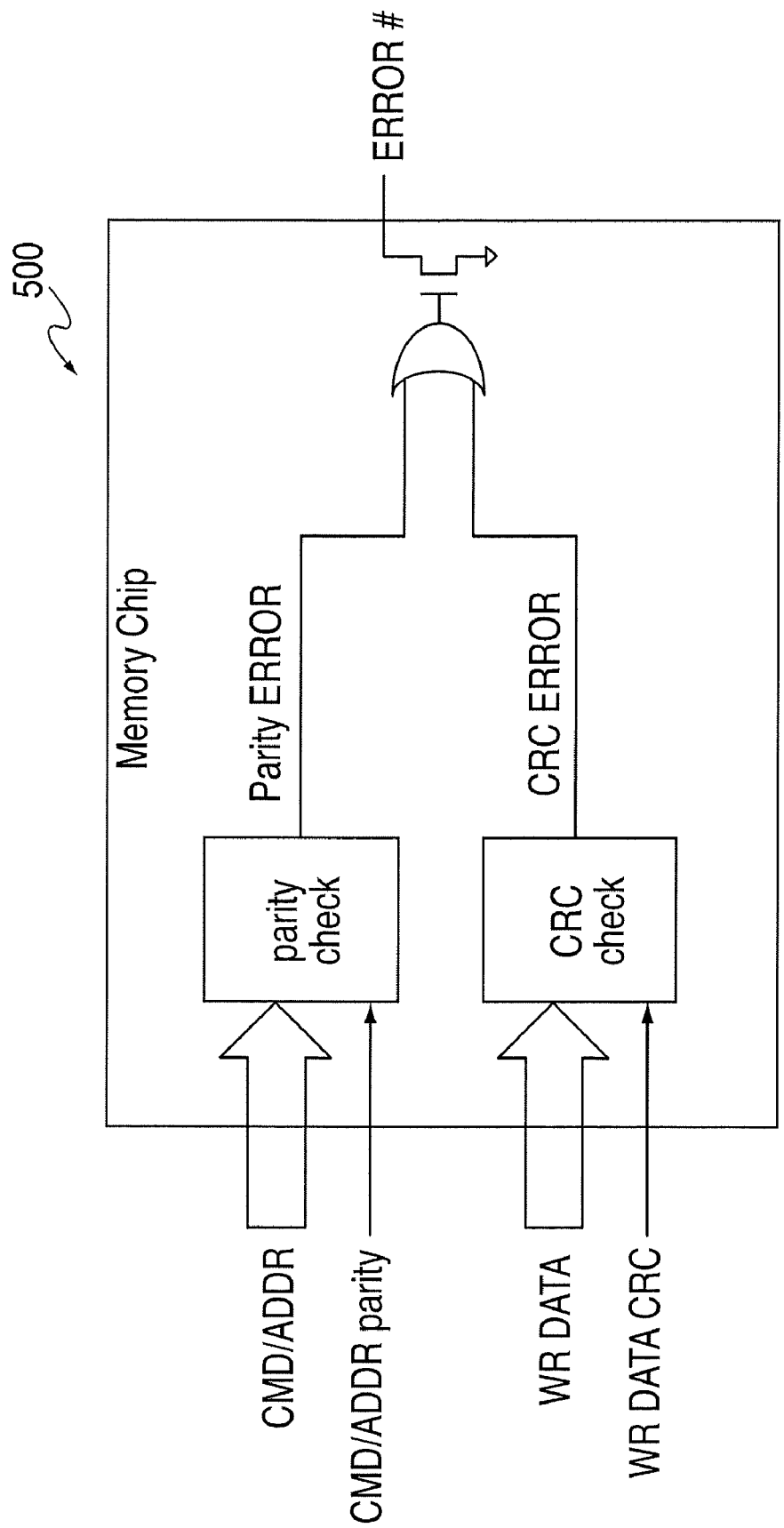
FIG. 5 is a block diagram of a memory device that shares an error feedback pin between data CRC and address parity in accordance with an exemplary embodiment of the present invention.

FIG. 5 is a block diagram of a memory device 500 that shares an error feedback pin between data CRC and address parity in accordance with an exemplary embodiment of the present invention. In alternate exemplary embodiments, other functions also share the error feedback pin (e.g., parity or CRC error(s) on command and address information).

Figure 6:
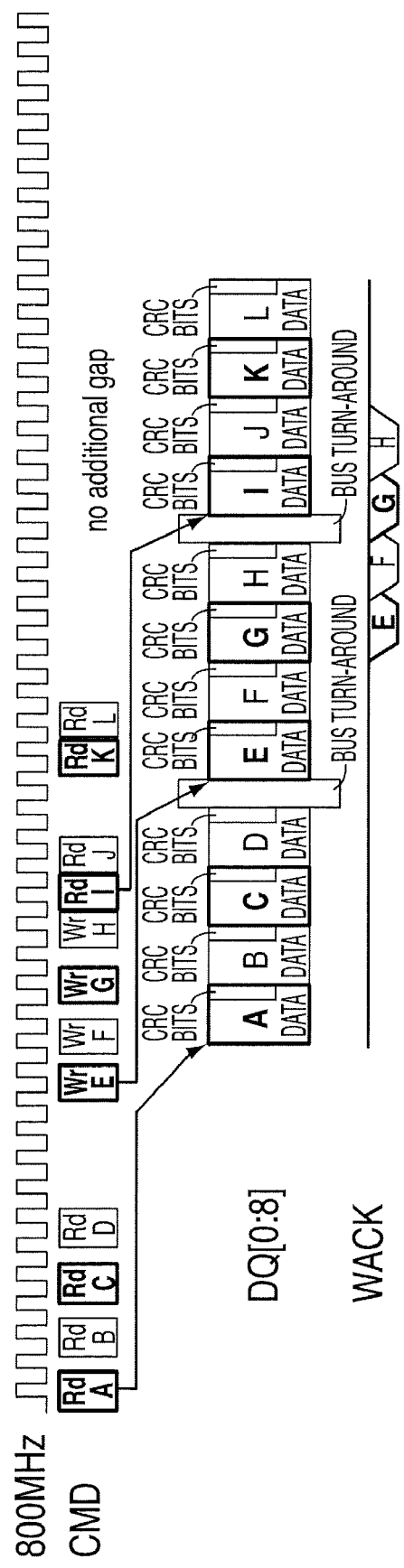
FIG. 6 depicts a read, write, read operational sequence for a memory system using the exemplary memory device and shared error feedback pin that may be implemented by an exemplary embodiment.

FIG. 6 depicts a process for providing a shared error feedback pin that may be implemented by an exemplary embodiment. FIG. 6 depicts a timing diagram for a read, write, read operation sequence, including bus turn-around time, at a memory device. Read commands A, B, C, and D are received from the memory controller via a memory bus (as shown here operating at 800 MHz). In response, a read is performed by the memory device and CRC bits are calculated. In the exemplary embodiment, the data and the CRC bits are combined into a multi-transfer packet, comprised of 32 bits of data (for a x4 device) or 64 bits of data (for a x8 device) in addition to the associated CRC bits.DQ[0:8]). Next four write commands are received at the memory device, at which time the memory device compares the data and CRC information received to the re-calculated CRC data to determine if an error exists in the write data. If such an error exists, the write operation, in the exemplary embodiment, would not be completed and the write acknowledge bit (error) would be driven as soon as possible to indicate the existence of the error. If no error is present, or if the write operation is permitted independent of the existence of an error or prior to the determination of an error, the write operation is completed. Prior to the completion of the write operation to the memory device, the memory device bus requires a turn-around time to enable data to be received after a read operation has been completed (e.g. the bus has to return to a known, predictable and stable condition). Once the bus is available for writing data, the data associated with the write command is written to the memory device. As indicated earlier, if an error is found to be present in the write data or CRC, the write acknowledge (WACK, also referred to as the error feedback line) is driven to indicate the presence of a write data error. In an exemplary embodiment, the data is received by the memory device (the data includes CRC bits), the CRC bits are regenerated by the memory device, and the memory device compares the received CRC bits to the regenerated CRC bits. If the result of this comparison indicates the presence of one or more errors, an indication of an error is sent to the memory controller or other error-responsive device via the WACK driver, via a pad on the memory device.

FIG. 7 depicts an exemplary polynomial that may be implemented by an exemplary embodiment for an "8" bit memory device operable with 8 transfers (e.g. a burst of 8 data transfers). In the exemplary embodiment, the 8 bit memory device is operable with 9 data bit lanes to accommodate the CRC bits. FIG. 8 depicts an expanded version of the polynomial depicted in FIG. 7.

FIG. 9 depicts an exemplary polynomial that may be implemented by an exemplary embodiment for a "4" bit memory device operable with 8 transfers, similar to that described above. In this example, 5 bit lanes are used to accommodate the CRC bits. FIG. 10 depicts an expanded version of the polynomial depicted in FIG. 9.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including soldered interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated with the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory device comprising a receiver, a driver circuitry, and an error pin that is shared by the memory device and at least one other memory device, the memory device configured to perform a method comprising:
   receiving, via the receiver, write data and cyclical redundancy code (CRC) bits from a memory controller;
   generating CRC bits responsive to the write data;
   comparing the received CRC bits to the generated CRC bits;
   based on determining that the received CRC bits are not equal to the generated CRC bits, generating, by the driver circuitry, an error signal; and based on determining that there is no error based on the received CRC bits being equal to the generated CRC bits, completing a write operation to the memory device.

2. The memory device of claim 1, wherein generating the error signal comprises outputting the error signal from the memory device via the error pin.

3. The memory device of claim 2, further comprising reporting, via the error pin, an existence of parity or other errors associated with address and command information received by the memory device.

4. The memory device of claim 1, wherein the error signal is transmitted to the memory controller.

5. The memory device of claim 1, wherein the received CRC bits are generated responsive to the data and to a CRC polynomial equation, and the generating, by a memory device, CRC bits is further responsive to the CRC polynomial equation.

6. The memory device of claim 1, wherein the memory device is located on a memory module that includes at least one other memory device.

7. The memory device of claim 1, wherein the data and CRC bits are received over multiple transfers, the multiple transfers comprising a packet of information.

8. A method comprising:
receiving write data and cyclical redundancy code (CRC) bits from a memory controller;
generating, by a memory device, CRC bits responsive to the write data;
comparing, by the memory device, the received CRC bits to the generated CRC bits;
based on determining that the received CRC bits are not equal to the generated CRC bits, generating, by the memory device, an error signal;
based on determining that there is no error based on the received CRC bits being equal to the generated CRC bits, completing a write operation to the memory device; and
wherein generating the error signal comprises outputting the error signal from the memory device via an error pin that is shared by the memory device and at least one other memory device.

9. The method of claim 8, further comprising reporting, via the error pin, an existence of parity or other errors associated with address and command information received by the memory device.

10. The method of claim 8, wherein the error signal is transmitted to the memory controller.

11. The method of claim 8, wherein the received CRC bits are generated responsive to the data and to a CRC polynomial equation, and the generating, by a memory device, CRC bits is further responsive to the CRC polynomial equation.

12. The method of claim 8, wherein the memory device is located on a memory module that includes at least one other memory device.

13. The method of claim 8, wherein the data and CRC bits are received over multiple transfers, the multiple transfers comprising a packet of information.

14. A computer program product for writing to a memory device, the computer program product comprising:
a tangible storage medium readable by a processing circuit and storing instructions for execution by the processing circuit for performing a method comprising:
receiving, via the receiver, write data and cyclical redundancy code (CRC) bits from a memory controller;
generating CRC bits responsive to the write data;
comparing the received CRC bits to the generated CRC bits;
based on determining that the received CRC bits are not equal to the generated CRC bits, generating, by the driver circuitry, an error signal; and
based on determining that there is no error based on the received CRC bits being equal to the generated CRC bits, completing a write operation to the memory device; and
wherein generating the error signal comprises outputting the error signal from the memory device via an error pin that is shared by the memory device and at least one other memory device.

15. The computer program product of claim 14, wherein the method further comprises reporting, via the error pin, an existence of parity or other errors associated with address and command information received by the memory device.

16. The computer program product of claim 14, wherein the error signal is transmitted to the memory controller.

17. The computer program product of claim 14, wherein the memory device is located on a memory module that includes at least one other memory device.

18. The computer program product of claim 14, wherein the data and CRC bits are received over multiple transfers, the multiple transfers comprising a packet of information.

* * * * *